United States Patent
Zheng et al.

(10) Patent No.: US 10,643,033 B2
(45) Date of Patent: May 5, 2020

(54) METHOD AND APPARATUS FOR CUSTOMIZING WORD SEGMENTATION MODEL BASED ON ARTIFICIAL INTELLIGENCE, DEVICE AND MEDIUM

(71) Applicant: BEIJING BAIDU NETCOM SCIENCE AND TECHNOLOGY CO., LTD., Beijing (CN)

(72) Inventors: Liqun Zheng, Beijing (CN); Jinbo Zhan, Beijing (CN); Qiugen Xiao, Beijing (CN); Zhihong Fu, Beijing (CN); Jingzhou He, Beijing (CN); Guyue Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 125 days.

(21) Appl. No.: 15/941,065

(22) Filed: Mar. 30, 2018

(65) Prior Publication Data

US 2018/0365227 A1    Dec. 20, 2018

(30) Foreign Application Priority Data

Jun. 14, 2017    (CN) .......................... 2017 1 0448262

(51) Int. Cl.
*G10L 15/26*    (2006.01)
*G06F 40/30*    (2020.01)
*G06F 40/279*    (2020.01)

(52) U.S. Cl.
CPC ............ *G06F 40/30* (2020.01); *G06F 40/279* (2020.01)

(58) Field of Classification Search
CPC .................................. G06F 17/00; G06F 17/28
See application file for complete search history.

(56) References Cited

U.S. PATENT DOCUMENTS

| | | | | |
|---|---|---|---|---|
| 9,959,271 | B1* | 5/2018 | Goyal | G06F 17/2818 |
| 2005/0209844 | A1* | 9/2005 | Wu | G06F 17/2223 704/2 |
| 2009/0326916 | A1* | 12/2009 | Gao | G06F 17/277 704/4 |
| 2014/0012569 | A1* | 1/2014 | Sung | G06F 17/28 704/9 |
| 2016/0321239 | A1* | 11/2016 | Iso-Sipila | G06F 17/2755 |

OTHER PUBLICATIONS

Office Action issued in corresponding Chinese Application No. 201710448262.8 dated Jan. 22, 2020, and English ranslation thereof (13 pages).

(Continued)

*Primary Examiner* — Shreyans A Patel
(74) *Attorney, Agent, or Firm* — Osha Liang LLP (57) ABSTRACT

Embodiments of the present disclosure disclose a method and an apparatus for customizing a word segmentation model based on artificial intelligence, a device and a medium. The method includes the followings. A customized segmentation training corpus is acquired. A first preset word segmentation model is rectified with an increment training method or a weight intervention method, based on the customized segmentation training corpus, to obtain a customized word segmentation model corresponding to the customized segmentation training corpus.

15 Claims, 3 Drawing Sheets

Fig. 1

(56) References Cited

OTHER PUBLICATIONS

Mai, F., et al., "Research on the Chinese Word segmentation System based on Incremental Learning" College of Mechanical and Control Engineering, Gulin University of Technology, Applied Mechanics and Materials, ISSN 1662-7482 (3 pages).

Bing, H., et al., "Research on incremental training method of Chinese word segmentation based on perceptron", Journal of Chinese Information Processing, Harbin Institute of Technology, vol. 29, No. 5. Sep. 2015 (17 pages).

* cited by examiner

METHOD AND APPARATUS FOR CUSTOMIZING WORD SEGMENTATION MODEL BASED ON ARTIFICIAL INTELLIGENCE, DEVICE AND MEDIUM

CROSS-REFERENCE TO RELATED APPLICATIONS

This application is based on and claims a priority to Chinese Patent Application Serial No. 201710448262.8, filed on Jun. 14, 2017, the entire content of which is incorporated herein by reference.

TECHNICAL FIELD

The present disclosure relates to the field of word segmentation model processing technology, and more particularly, to a method and an apparatus for customizing a word segmentation model, a device and a medium.

BACKGROUND

Artificial intelligence (AI) is a new technical science studying and developing theories, methods, techniques and application systems for simulating, extending and expanding human intelligence. AI is a branch of computer science, which attempts to know the essence of intelligence and to produce an intelligent robot capable of acting as a human. The researches in this field include robots, voice recognition, image recognition, natural language processing and expert systems, etc.

Chinese word segmentation refers to that a Chinese character sequence is segmented into independent words. The Chinese word segmentation is foundation of text mining. For a section of Chinese inputted, successful Chinese word segmentation can make the computer automatically recognize sentence meaning.

Generally, a Chinese word segmentation model in related arts is a common word segmentation model, which cannot accurately perform the word segmentation in a professional field or in a specific scene. In related arts, the common word segmentation model is generally re-trained with a segmentation training corpus of the professional field or the specific scene, to obtain a word segmentation model corresponding to the professional field or the specific scene.

It takes much time and labor for the above method of obtaining the word segmentation model corresponding to the professional field or the specific scene. Furthermore, it is difficult to guarantee segmentation quality.

SUMMARY

In a first aspect, embodiments of the present disclosure provide a method for customizing a word segmentation model based on artificial intelligence. The method includes: acquiring a customized segmentation training corpus; rectifying a first preset word segmentation model with an increment training method or a weight intervention method, based on the customized segmentation training corpus, to obtain a customized word segmentation model corresponding to the customized segmentation training corpus.

In a second aspect, embodiments of the present disclosure provide a device. The device includes: one or more processors; a storage device, configured to store one or more programs, in which when the one or more programs are executed by the one or more processors, the above method is executed by the one or more processors.

In a third aspect, embodiments of the present disclosure provide a storage medium having computer executable instructions. When the computer executable instructions are executed by a processor of a computer, the above method is executed.

DETAILED DESCRIPTION

In order to make purposes, technical solutions and advantages of the present disclosure more apparent, detailed descriptions will be made to specific embodiments of the present disclosure with reference to drawings. It may be understood that, the specific embodiments of the present disclosure described herein merely serve to explain the present disclosure, and are not construed to limit the present disclosure.

In addition, it should also be noted that, for convenience of description, only parts related to the present disclosure are illustrated in the drawings, instead of all of the present disclosure. Before discussing exemplary embodiments in more detail, it should be mentioned that some exemplary embodiments are described as processes or methods depicted as the flow charts. Although various operations (or steps) described in the flow charts are sequential, many of these operations may be performed in parallel, concurrently, or simultaneously. In addition, a sequence of operations can be rearranged. The process may be terminated when its operations are completed, but may also have additional steps that are not included in the drawings. The process may correspond to methods, functions, procedures, subroutines, subprograms, and the like.

Figure 1:
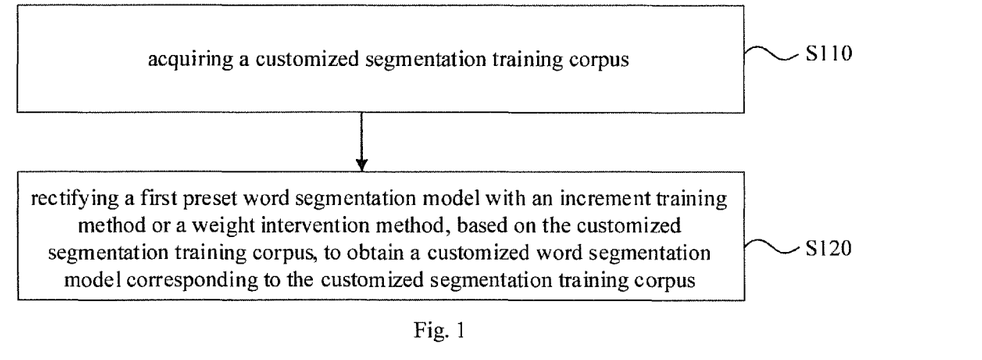
FIG. 1 is a flow chart illustrating a method for customizing a word segmentation model based on artificial intelligence according to an embodiment of the present disclosure.

FIG. 1 is a flow chart illustrating a method for customizing a word segmentation model based on artificial intelligence according to an embodiment of the present disclosure. The method according to the embodiment of the present disclosure may be executed by an apparatus for customizing a word segmentation model based on artificial intelligence. The apparatus may be implemented in hardware and/or software and may generally be integrated into a server for providing a function of customizing a word segmentation model. The method includes the followings.

In block 110, a customized segmentation training corpus is acquired.

In embodiments, the customized segmentation training corpus may refer to a segmentation-performed corpus of which a segmentation method satisfies a professional field requirement, a specific scene requirement or a user specific requirement. The customized segmentation training corpus may be acquired via a direct input of a user, via a download through a link address inputted by the user, or via an extraction from an internal stored segmentation corpus, which is not limited in the embodiments.

In block 120, a first preset word segmentation model is rectified with an increment training method or a weight intervention method based on the customized segmentation training corpus, to obtain a customized word segmentation model corresponding to the customized segmentation training corpus.

In embodiments, the first preset word segmentation model may be a commonly-used word segmentation model, or may be a dedicated word segmentation model, which is not limited in the embodiments. Certainly, the first preset word segmentation model may also be a customized word segmentation model generated after the blocks 110 and 120 included in the embodiments. In other words, customizing may be performed on the customized word segmentation model again.

Further, in embodiments, the first preset word segmentation model may be acquired via a direct input of a user, via a download through a link address inputted by the user, or via an extraction from an internal stored segmentation corpus, which is not limited in embodiments.

It may be understood by those skilled in the art that, the existing word segmentation model is generally the commonly-used word segmentation model. The commonly-used word segmentation model has an accurate segmentation result for daily expression, frequently-used phrases. However, it is difficult to accurately segment professional phrases in the professional filed or specific phrases in the specific scene with the commonly-used word segmentation model. Therefore, the first preset word segmentation model is rectified with the customized segmentation training corpus in embodiments, such that the rectified word segmentation model may accurately segment a text based on a segmentation manner of the customized segmentation training corpus.

In embodiments, rectifying the first preset word segmentation model with the increment training method may be described as follows. The customized segmentation training corpus is segmented with the first preset word segmentation model to obtain a first segmentation result. The first segmentation result is compared with the customized segmentation training corpus and a first update parameter is acquired based on a preset rule. The first preset word segmentation model is updated based on the first update parameter to obtain the customized word segmentation model corresponding to the customized segmentation training corpus.

In embodiments, rectifying the first preset word segmentation model with the weight intervention method may be described as follows. A word segmentation model rectification parameter is generated based on the customized segmentation training corpus. The customized word segmentation model corresponding to the customized segmentation training corpus is generated based on the word segmentation model rectification parameter and a model parameter of the first preset word segmentation model.

In embodiments, after the customized word segmentation model corresponding to the customized segmentation training corpus is obtained, the customized word segmentation model may be stored in a preset storage area. Alternatively, the customized word segmentation model may be output to the user. Alternatively, the customized word segmentation model may be stored in a preset server based on requirements of the user. The three above ways may be implemented simultaneously, or two of the three ways may be implemented simultaneously.

Further, in embodiments, after the customized word segmentation model corresponding to the customized segmentation training corpus is obtained, the customized segmentation training corpus may also be stored in the preset storage area. Furthermore, a statistic and analysis may also be performed on all stored customized segmentation training corpuses at a preset time point or after a reception of an operation instruction. The first preset word segmentation model or other word segmentation models may be rectified based on a statistic and analysis result. The rectification method may be the increment training method and the like.

With the method for customizing a word segmentation model based on artificial intelligence according to the embodiments of the present disclosure, the customized segmentation training corpus is acquired firstly, and then the first preset word segmentation model is rectified with the increment training method or the weight intervention method based on the customized segmentation training corpus to obtain the customized word segmentation model corresponding to the customized segmentation training corpus. Therefore, a technical problem in related arts that it takes much time and labor to obtain a word segmentation model corresponding to a professional field or a specific scene by re-training an existing word segmentation model is solved. In addition, it realizes to rapidly and easily rectify an existing word segmentation model based on actual segmentation needs of a user to obtain a word segmentation model satisfying special segmentation requirements of the user.

Figure 2:
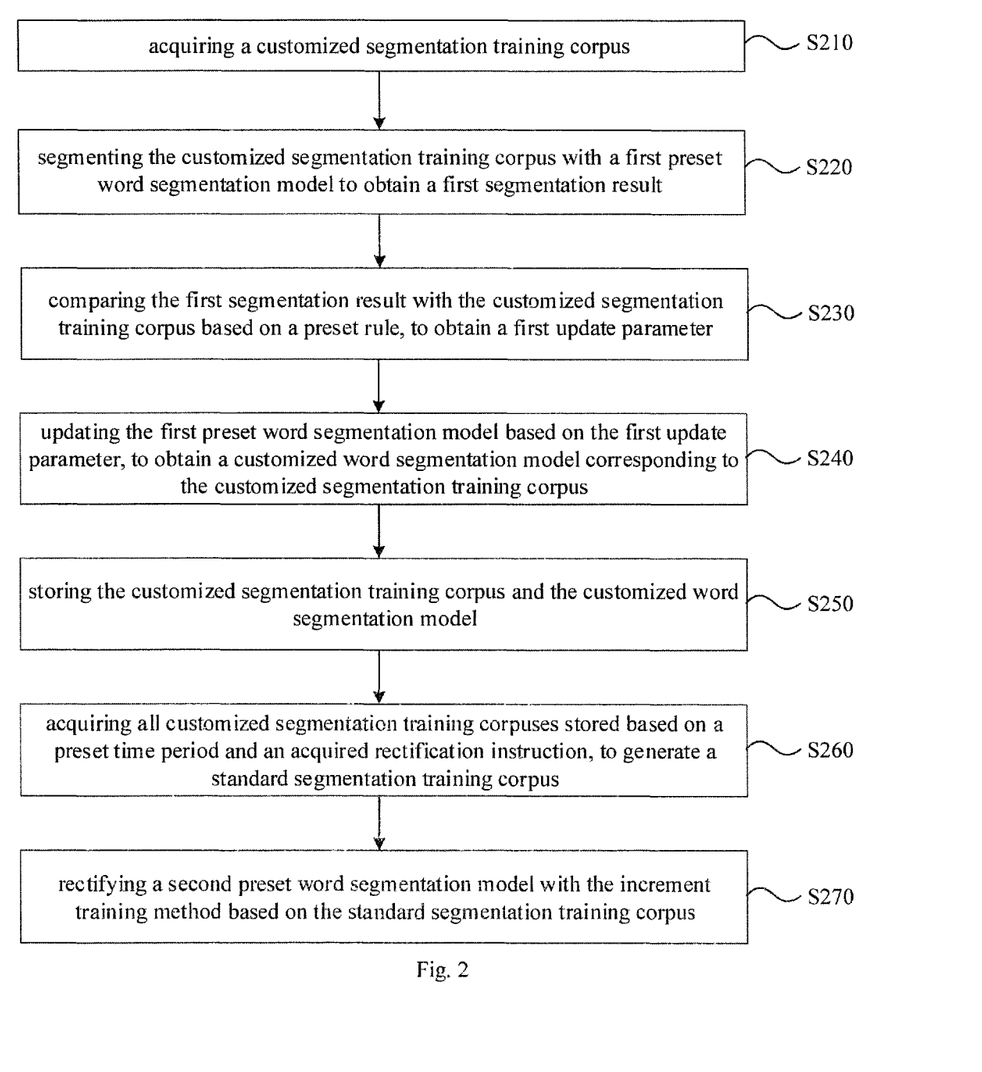
FIG. 2 is a flow chart illustrating a method for customizing a word segmentation model based on artificial intelligence according to another embodiment of the present disclosure.

FIG. 2 is a flow chart illustrating a method for customizing a word segmentation model based on artificial intelligence according to another embodiment of the present disclosure. This embodiment is optimized on the basis of the above embodiment. In embodiments, rectifying the first preset word segmentation model with the increment training method or the weight intervention method based on the customized segmentation training corpus to obtain the customized word segmentation model corresponding to the customized segmentation training corpus may be described as follows. The customized segmentation training corpus is segmented with the first preset word segmentation model to obtain a first segmentation result. The first segmentation result is compared with the customized segmentation training corpus based on a preset rule, to acquire a first update parameter. The first preset word segmentation model is updated based on the first update parameter, to obtain the customized word segmentation model corresponding to the customized segmentation training corpus.

Further, the method also includes storing the customized segmentation training corpus and the customized word segmentation model.

Further, the method also includes the followings. All customized segmentation training corpuses stored are acquired based on a preset time period or based on an acquired rectification instruction, to generate a standard segmentation training corpus. Furthermore, a second preset word segmentation model is rectified with the increment training method based on the standard segmentation training corpus.

Accordingly, the method according to embodiments of the present disclosure further includes the followings.

In block 210, the customized segmentation training corpus is acquired.

In block 220, the customized segmentation training corpus is segmented with the first preset word segmentation model, to obtain the first segmentation result.

In embodiments, after the customized segmentation training corpus is acquired, the first preset word segmentation model may be acquired based on an operation instruction of the user. The customized segmentation training corpus is segmented with the first preset word segmentation model.

In embodiments, a method for segmenting the customized segmentation training corpus with the first preset word segmentation model may be described as follows. A transition matrix is acquired based on the first preset word segmentation model, and an emission matrix is acquired based on the first preset word segmentation model and the customized segmentation training corpus. A Markoff decoding is performed on the emission matrix and the transition matrix, to acquire the first segmentation result.

In block 230, the first segmentation result is compared with the customized segmentation training corpus based on the preset rule, to obtain the first update parameter.

In embodiments, the preset rule may be a random gradient descent method and the like. The first update parameter refers to a value required to be updated for each model parameter of the first preset word segmentation model.

In block 240, the first preset word segmentation model is updated based on the first update parameter, to obtain the customized word segmentation model corresponding to the customized segmentation training corpus.

In embodiments, after the first update parameter is acquired, the model parameter of the first preset word segmentation model may be rectified based on the first update parameter, to obtain the customized word segmentation model corresponding to the customize segmentation training corpus. The rectified first preset word segmentation model may not only realize existing segmentation effect, but also realize an accurate segmentation of phrases included in the customized segmentation training corpus.

In block 250, the customized segmentation training corpus and the customized word segmentation model are stored.

In embodiments, after the customized word segmentation model corresponding to the customized segmentation training corpus is acquired, the customized word segmentation model may be stored in a preset storage area or in a preset server based on an instruction of the user. In addition, the customized segmentation training corpus and the customized word segmentation model may be stored in the same preset storage area, or may be stored in different preset storage areas, which is not limited in embodiments of the present disclosure.

Further, when the customized word segmentation model is stored in the preset server based on the instruction of the user, the user may be informed of a storage address via a link form, such that the user may perform a download. The preset server may be a cloud server or the like.

In block 260, all customized segmentation training corpuses stored are acquired based on a preset time period or based on an acquired rectification instruction, to generate a standard segmentation training corpus.

The blocks 260 and 270 illustrated in embodiments describe a process of rectifying a second preset word segmentation model. In other words, in embodiments, after the customized word segmentation model is acquired, the second preset word segmentation model may also be rectified. The second preset word segmentation model may be for example the customized word segmentation model obtained in block 240, or may be the first preset word segmentation model.

In embodiments, based on the preset time period or after the acquirement of the rectification instruction input by the user, all customized segmentation training corpuses stored may be acquired. A statistic and analysis is performed on all stored customized segmentation training corpuses. The standard segmentation training corpus is acquired based on a statistic and analysis result.

In block 270, the second preset word segmentation model is rectified with the increment training method based on the standard segmentation training corpus.

In embodiments, rectifying the second preset word segmentation model with the increment training method may be described as follows. The standard segmentation training corpus is segmented with the second preset word segmentation model, to obtain a second segmentation result. The second segmentation result is compared with the standard segmentation training corpus based on the preset rule, to obtain a second update parameter. The second preset word segmentation model is updated based on the second update parameter, to obtain the customized word segmentation model corresponding to the standard segmentation training corpus.

With the method for customizing a word segmentation model based on artificial intelligence according to the embodiments of the present disclosure, a method for rectifying the first preset word segmentation model is embodied. The customized word segmentation model may be acquired easily and rapidly. Storage of the customized segmentation training corpus and the customized word segmentation model are improved optimally. Furthermore, a rectification of the second preset word segmentation model based on the stored customized segmentation training corpuses is improved optimally, and the second preset word segmentation model is optimized. With the method, the first preset word segmentation model does not need to be re-trained, that is the customized word segmentation model corresponding to the customized segmentation training corpus may be acquired easily and rapidly. Moreover, the customized word segmentation model may be constantly optimized based on the stored customized segmentation training corpuses, thereby improving segmentation effect, forming a good circle, and saving time and cost of collecting corpuses and labelling corpuses.

Figure 3:
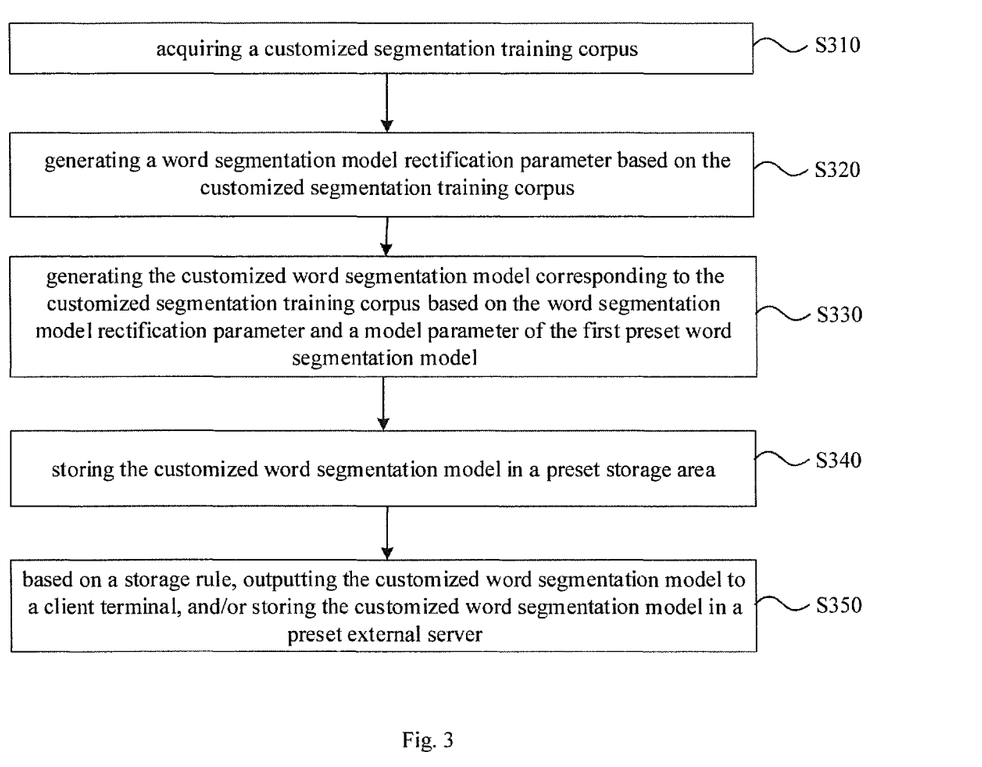
FIG. 3 is a flow chart illustrating a method for customizing a word segmentation model based on artificial intelligence according to still another embodiment of the present disclosure.

FIG. 3 is a flow chart illustrating a method for customizing a word segmentation model based on artificial intelligence according to still another embodiment of the present disclosure. This embodiment is optimized on the basis of the above embodiment(s). In embodiments, rectifying the first preset word segmentation model with the increment training method or the weight intervention method based on the customized segmentation training corpus, to obtain the customized word segmentation model corresponding to the customized segmentation training corpus is described as follows. A word segmentation model rectification parameter is generated based on the customized segmentation training corpus. Furthermore, the customized word segmentation model corresponding to the customized segmentation training corpus is generated based on the word segmentation model rectification parameter and a model parameter of the first preset word segmentation model.

Further, storing the customized segmentation training corpus and the customized word segmentation model may be described as follows. The customized word segmentation model is stored in a preset storage area. Based on a storage rule, the customized word segmentation model is output to a client terminal, and/or the customized word segmentation model is stored in a preset external server.

Accordingly, the method according to embodiments includes the followings.

In block 310, the customized segmentation training corpus is acquired.

In block 320, the word segmentation model rectification model is generated based on the customized segmentation training corpus.

In embodiment, a method for acquiring the word segmentation model rectification parameter may be taking a feature weight of the customized segmentation training corpus as the word segmentation model rectification parameter. The feature weight of the customized segmentation training corpus may be acquired via neural network.

In block 330, the customized word segmentation model corresponding to the customized segmentation training corpus is generated based on the word segmentation model rectification model and the model parameter of the first preset word segmentation model.

In embodiments, generating the customized word segmentation model corresponding to the customized segmentation training corpus may be described as follows. The word segmentation model rectification model and the model parameter of the first preset word segmentation model may be merged, but respective values thereof may be not changed. Therefore, the model parameter of the customized word segmentation model corresponding to the customized segmentation training corpus is acquired, and the customized word segmentation model corresponding to the customized segmentation training corpus may be acquired based on this model parameter.

In a particular example, the word segmentation model rectification model is denoted as $$\begin{bmatrix} B1 & B2 \\ B3 & B4 \end{bmatrix},$$

the model parameter of the first preset word segmentation model is denoted as $$\begin{bmatrix} A1 & A2 & A3 \\ A4 & A5 & A6 \\ A7 & A8 & A9 \end{bmatrix},$$

and then, the model parameter of the customized word segmentation model corresponding to the customized segmentation training corpus is denoted as $$\begin{bmatrix} A1 & A2 & A3 \\ A4 & A5 & A6 \\ A7 & A8 & A9 \\ B1 & B2 & \\ B3 & B4 & \end{bmatrix}.$$

In block 304, the customized word segmentation model is stored in a preset storage area.

In embodiments, after the customized word segmentation model is generated, the customized word segmentation model is stored in the preset storage area.

In block 350, based on the storage rule, the customized word segmentation model is output to the client terminal and/or the customized word segmentation model is stored in the preset external server.

In embodiments, the storage rule refers to an operation instruction, inputted by the user, indicating a storage manner of the customized word segmentation model. Particularly, the above operation instruction may be one of the followings. A first one is that the customized word segmentation model is merely outputted to the client terminal. A second one is that the customized word segmentation model is merely stored in the preset external server. A third one is that the customized word segmentation model is not only outputted to the client terminal, but also is stored in the preset external server. The preset external server may be a cloud server. In a case that the customized word segmentation model is stored in the preset external server, after the customized word segmentation model is stored in the preset external server, a storage address may be provided to the user via a link form, such that the user may perform a download.

With the method for customizing a word segmentation model based on artificial intelligence according to the embodiments of the preset disclosure, a method for rectifying the first preset word segmentation model is embodied. The customized word segmentation model corresponding to the customized segmentation training corpus is acquired easily and rapidly. Moreover, storage manners of the customized word segmentation model are embodied, and flexibility of storing the customized word segmentation model is improved. With the method, it does not need to retrain the first preset word segmentation model, and the customized word segmentation model corresponding to the customized segmentation training corpus may be easily and rapidly acquired. Furthermore, a plurality of storage manners of the customized word segmentation model may be provided to the user, such that the user may utilize and rectify the customized word segmentation model.

Figure 4:
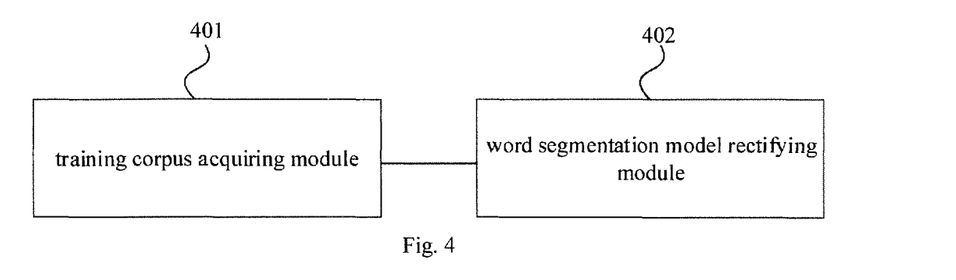
FIG. 4 is a block diagram illustrating an apparatus for customizing a word segmentation model based on artificial intelligence according to an embodiment of the present disclosure.

FIG. 4 is a block diagram illustrating an apparatus for customizing a word segmentation model based on artificial intelligence according to yet another of the present disclosure. As illustrated in FIG. 4, the apparatus includes a training corpus acquiring module 401 and a word segmentation model rectifying module 402.

The training corpus acquiring module 401 is configured to acquire a customized segmentation training corpus.

The word segmentation model rectifying module 402 is configured to rectify a first preset word segmentation model with an increment training method or a weight intervention method based on the customized segmentation training corpus, to obtain the customized word segmentation model corresponding to the customized segmentation training corpus.

With the apparatus for customizing a word segmentation model based on artificial intelligence according to the embodiments of the present disclosure, the customized segmentation training corpus is acquired firstly, and then the first preset word segmentation model is rectified with the increment training method or the weight intervention method based on the customized segmentation training corpus to obtain the customized word segmentation model corresponding to the customized segmentation training corpus. Therefore, a technical problem in related arts that it takes much time and labor to obtain a word segmentation model corresponding to a professional field or a specific scene by re-training an existing word segmentation model is solved. In addition, it realizes to rapidly and easily rectify an existing word segmentation model based on actual segmentation needs of a user to obtain a word segmentation model satisfying special segmentation requirements of the user.

On the basis of above embodiments, the word segmentation model rectifying module may include a segmentation processing unit, an update parameter acquiring unit, and a model updating unit.

The segmentation processing unit is configured to segment the customized segmentation training corpus with the first preset word segmentation model, to obtain a first segmentation result.

The update parameter acquiring unit is configured to compare the first segmentation result and the customized segmentation training corpus, to acquire a first update parameter based on a preset rule.

The model updating unit is configured to update the first preset word segmentation model based on the first update parameter, to obtain the customized word segmentation model corresponding to the customized segmentation training corpus.

On the basis of above embodiments, the word segmentation model rectifying module may include a rectification parameter generating unit and a first model rectifying unit.

The rectification parameter generating unit is configured to generate a word segmentation model rectification parameter based on the customized segmentation training corpus.

The first model rectifying unit is configured to generate the customized word segmentation model corresponding to the customized segmentation training corpus based on the word segmentation model rectification parameter and a model parameter of the first preset word segmentation model.

On the basis of above embodiments, the method may include a corpus storing module.

The corpus storing module is configured to store the customized segmentation training corpus and the customized word segmentation model.

On the basis of above embodiments, the method may further include a standard segmentation training corpus generating unit and a second model rectifying unit.

The standard segmentation training corpus generating unit is configured to acquire all customized segmentation training corpuses stored based on a preset time period or based on an acquired rectification instruction, to generate a standard segmentation training corpus.

The second model rectifying unit is configured to rectify a second preset word segmentation model with the increment training method based on the standard segmentation training corpus.

On the basis of above embodiments, the corpus storing module may include a model storing unit and a model outputting unit.

The model storing unit is configured to store the customized word segmentation model in a preset storage area.

The model outputting unit is configured to, based on a storage rule, output the customized word segmentation model to a client terminal and/or store the customized word segmentation model in a preset external server.

The apparatus for customizing a word segmentation model based on artificial intelligence according to embodiments of the present disclosure may be configured to execute the method for customizing a word segmentation model based on artificial intelligence according to any one of embodiments of the present disclosure, with corresponding functional modules for realizing same beneficial effects.

Figure 5:
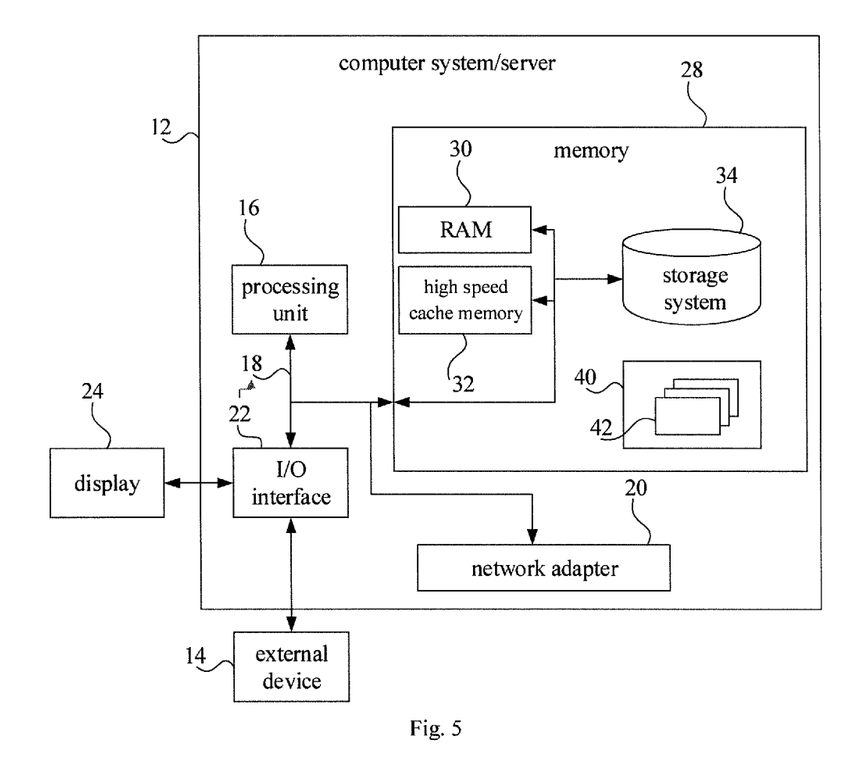
FIG. 5 is a block diagram illustrating a device according to an embodiment of the present disclosure.

FIG. 5 is a schematic diagram illustrating a device according to embodiments of the present disclosure. FIG. 5 illustrates a block diagram of an exemplary device 12 applicable to realize implementations of the present disclosure. The device 12 illustrated as FIG. 5 is merely an example, which is not limited to functions and usage scopes of embodiments of the present disclosure.

As illustrated in FIG. 5, the device 12 is implemented as a general computation device. Components of the device 12 may include but be not limited to: one or more processors or processing units 16; a system memory 28; and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (ISA) bus, a Micro Channel Architecture (MAC) bus, an enhanced ISA bus, a Video Electronics Standards Association (VESA) local bus and Peripheral Component Interconnection (PCI) bus.

The device 12 typically includes a variety of computer system readable media. These media may be any available media accessible by the device 12 and includes both volatile and non-volatile media, removable and non-removable media.

The system memory 28 may include a computer system readable medium in the form of volatile memory, such as a random access memory (RAM) 30 and/or a high speed cache memory 32. The device 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (CD-ROM), Digital Video Disc Read Only Memory (DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. Such the program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The device 12 may also communicate with one or more external devices 14 (such as, a keyboard, a pointing device, a display 24, etc.). Furthermore, the device 12 may also communicate with one or more communication devices enabling a user to interact with the device 12 and/or other devices (such as a network card, modem, etc.) enabling the device 12 to communicate with one or more computer devices. This communication can be performed via the input/output (I/O) interface 22. Also, the device 12 may communicate with one or more networks (such as a local area network (LAN), a wide area network (WAN) and/or a public network such as an Internet) through a network adapter 20. As shown in FIG. 5, the network adapter 20 communicates with other modules of the device 12 over the bus 18. It should be understood that, although not shown in FIG. 5, other hardware and/or software modules may be used in connection with the device 12. The hardware and/or software includes, but is not limited to, microcode, device drivers, redundant processing units, external disk drive arrays, RAID systems, a magnetic tape driver and a data backup storage system.

The processing unit 16 is configured to execute various functional applications and data processing by running programs stored in the system memory 28, for example, implementing the method for customizing a word segmentation model based on artificial intelligence according to embodiments of the present disclosure. The method for customizing a word segmentation model based on artificial intelligence includes the followings.

A customized segmentation training corpus is acquired.

A first preset word segmentation model is rectified with an increment training method or a weight intervention method based on the customized segmentation training corpus, to obtain a customized word segmentation model corresponding to the customized segmentation training corpus.

Embodiments of the present disclosure further provide a storage medium including computer executable instructions. When the computer executable instructions are executed by a processor of a computer, the method for customizing a word segmentation model based on artificial intelligence according to embodiments of the present disclosure is executed. The method for customizing a word segmentation model based on artificial intelligence includes the followings.

A customized segmentation training corpus is acquired.

A first preset word segmentation model is rectified with an increment training method or a weight intervention method based on the customized segmentation training corpus, to obtain a customized word segmentation model corresponding to the customized segmentation training corpus.

Any combination of one or more computer readable media may be adopted for the computer storage medium according to embodiments of the present disclosure. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. Specific examples of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In the specification, the computer readable storage medium may be any tangible medium including or storing programs. The programs may be used by an instruction executable system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable storage medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming languages include an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer and partly on a remote computer, or entirely on the remote computer or server. In a case of the remote computer, the remote computer may be connected to the user's computer through any kind of network, including a Local Area Network (LAN), or may be connected to a Wide Area Network (WAN) or an external computer (such as using an Internet service provider to connect over the Internet).

It should be noted that, the above descriptions are only preferred embodiments of the present disclosure and applied technical principles. Those skilled in the art should understand that the present disclosure is not limited to the specific embodiments described herein, and various apparent changes, readjustments and replacements can be made by those skilled in the art without departing from the scope of the present disclosure. Therefore, although the present disclosure has been described in detail by way of the above embodiments, the present disclosure is not limited only to the above embodiments and more other equivalent embodiments may be included without departing from the concept of the present disclosure. However, the scope of the present disclosure is determined by appended claims.

What is claimed is:

1. A method for customizing a word segmentation model based on artificial intelligence, comprising:
   acquiring a customized segmentation training corpus;
   rectifying a first preset word segmentation model with an increment training method or a weight intervention method, based on the customized segmentation training corpus, to obtain a customized word segmentation model corresponding to the customized segmentation training corpus,
   wherein, rectifying the first preset word segmentation model with the increment training method or the weight intervention method based on the customized segmentation training corpus to obtain the customized word segmentation model corresponding to the customized segmentation training corpus comprises:
   segmenting the customized segmentation training corpus with the first preset word segmentation model to obtain a first segmentation result;
   comparing the first segmentation result with the customized segmentation training corpus based on a preset rule, to obtain a first update parameter; and
   updating the first preset word segmentation model based on the first update parameter, to obtain the customized word segmentation model corresponding to the customized segmentation training corpus.

2. The method according to claim 1, wherein, rectifying the first preset word segmentation model with the increment training method or the weight intervention method based on the customized segmentation training corpus to obtain the customized word segmentation model corresponding to the customized segmentation training corpus comprises:
generating a word segmentation model rectification parameter based on the customized segmentation training corpus; and
generating the customized word segmentation model corresponding to the customized segmentation training corpus based on the word segmentation model rectification parameter and a model parameter of the first preset word segmentation model.

3. The method according to claim 1, further comprising:
storing the customized segmentation training corpus and the customized word segmentation model.

4. The method according to claim 3, further comprising:
acquiring all customized segmentation training corpuses stored based on a preset time period and an acquired rectification instruction, to generate a standard segmentation training corpus; and
rectifying a second preset word segmentation model with the increment training method based on the standard segmentation training corpus.

5. The method according to claim 3, wherein storing the customized word segmentation model comprises:
storing the customized word segmentation model in a preset storage area; and
based on a storage rule, outputting the customized word segmentation model to a client terminal, and/or storing the customized word segmentation model in a preset external server.

6. A device, comprising:
one or more processors;
a storage device, configured to store one or more programs,
wherein the one or more processors are configured to execute the one or more programs by reading the one or more programs from the storage device, to perform acts of:
acquiring a customized segmentation training corpus;
rectifying a first preset word segmentation model with an increment training method or a weight intervention method, based on the customized segmentation training corpus, to obtain a customized word segmentation model corresponding to the customized segmentation training corpus,
wherein, the one or more processors are configured to rectify the first preset word segmentation model with the increment training method or the weight intervention method based on the customized segmentation training corpus to obtain the customized word segmentation model corresponding to the customized segmentation training corpus by acts of:
segmenting the customized segmentation training corpus with the first preset word segmentation model to obtain a first segmentation result;
comparing the first segmentation result with the customized segmentation training corpus based on a preset rule, to obtain a first update parameter; and
updating the first preset word segmentation model based on the first update parameter, to obtain the customized word segmentation model corresponding to the customized segmentation training corpus.

7. The device according to claim 6, wherein the one or more processors are configured to rectify the first preset word segmentation model with the increment training method or the weight intervention method based on the customized segmentation training corpus to obtain the customized word segmentation model corresponding to the customized segmentation training corpus by acts of:
generating a word segmentation model rectification parameter based on the customized segmentation training corpus; and
generating the customized word segmentation model corresponding to the customized segmentation training corpus based on the word segmentation model rectification parameter and a model parameter of the first preset word segmentation model.

8. The device according to claim 6, wherein the one or more processors are configured to perform acts of:
storing the customized segmentation training corpus and the customized word segmentation model.

9. The device according to claim 8, wherein the one or more processors are configured to perform acts of:
acquiring all customized segmentation training corpuses stored based on a preset time period and an acquired rectification instruction, to generate a standard segmentation training corpus; and
rectifying a second preset word segmentation model with the increment training method based on the standard segmentation training corpus.

10. The device according to claim 8, wherein the one or more processors are configured to store the customized word segmentation model by acts of:
storing the customized word segmentation model in a preset storage area; and
based on a storage rule, outputting the customized word segmentation model to a client terminal, and/or storing the customized word segmentation model in a preset external server.

11. A non-transitory storage medium having computer executable instructions, wherein when the computer executable instructions are executed by a processor of a computer, a method for customizing a word segmentation model based on artificial intelligence is executed, the method comprising:
acquiring a customized segmentation training corpus;
rectifying a first preset word segmentation model with an increment training method or a weight intervention method, based on the customized segmentation training corpus, to obtain a customized word segmentation model corresponding to the customized segmentation training corpus,
wherein, rectifying the first preset word segmentation model with the increment training method or the weight intervention method based on the customized segmentation training corpus to obtain the customized word segmentation model corresponding to the customized segmentation training corpus comprises:
segmenting the customized segmentation training corpus with the first preset word segmentation model to obtain a first segmentation result;
comparing the first segmentation result with the customized segmentation training corpus based on a preset rule, to obtain a first update parameter; and
updating the first preset word segmentation model based on the first update parameter, to obtain the customized word segmentation model corresponding to the customized segmentation training corpus.

12. The non-transitory storage medium according to claim 11, wherein, rectifying the first preset word segmentation model with the increment training method or the weight intervention method based on the customized segmentation training corpus to obtain the customized word segmentation model corresponding to the customized segmentation training corpus comprises:
- generating a word segmentation model rectification parameter based on the customized segmentation training corpus; and
- generating the customized word segmentation model corresponding to the customized segmentation training corpus based on the word segmentation model rectification parameter and a model parameter of the first preset word segmentation model.

13. The non-transitory storage medium according to claim 11, wherein, the method further comprises:
- storing the customized segmentation training corpus and the customized word segmentation model.

14. The non-transitory storage medium according to claim 13, wherein, the method further comprises:
- acquiring all customized segmentation training corpuses stored based on a preset time period and an acquired rectification instruction, to generate a standard segmentation training corpus; and
- rectifying a second preset word segmentation model with the increment training method based on the standard segmentation training corpus.

15. The non-transitory storage medium according to claim 13, wherein, storing the customized word segmentation model comprises:
- storing the customized word segmentation model in a preset storage area; and
- based on a storage rule, outputting the customized word segmentation model to a client terminal, and/or storing the customized word segmentation model in a preset external server.

* * * * *